United States Patent
Uneura et al.

(10) Patent No.: US 12,018,714 B2
(45) Date of Patent: Jun. 25, 2024

(54) MULTILOBE BEARING

(71) Applicant: IHI Corporation, Tokyo (JP)

(72) Inventors: Yutaka Uneura, Tokyo (JP); Shunsuke Nishii, Tokyo (JP); Hiroki Mochizuki, Tokyo (JP)

(73) Assignee: IHI Corporation, Tokyo (JP)

( * ) Notice: Subject to any disclaimer, the term of this patent is extended or adjusted under 35 U.S.C. 154(b) by 50 days.

(21) Appl. No.: 17/816,460

(22) Filed: Aug. 1, 2022

(65) Prior Publication Data

US 2022/0364592 A1 Nov. 17, 2022

Related U.S. Application Data

(63) Continuation of application No. PCT/JP2020/042658, filed on Nov. 16, 2020.

(30) Foreign Application Priority Data

Apr. 6, 2020 (JP) ................. 2020-068572

(51) Int. Cl.
*F16C 17/02* (2006.01)
*F04D 29/047* (2006.01)
(Continued)

(52) U.S. Cl.
CPC .......... *F16C 17/028* (2013.01); *F04D 29/047* (2013.01); *F04D 29/057* (2013.01);
(Continued)

(58) Field of Classification Search
CPC .... F16C 17/028; F16C 17/18; F16C 33/1075; F16C 2240/26; F16C 2240/70;
(Continued)

(56) References Cited

U.S. PATENT DOCUMENTS

| 6,402,385 B1 | 6/2002 | Hayakawa et al. |
| 10,393,010 B2 * | 8/2019 | Ueda .................. F16C 32/0633 |

(Continued)

FOREIGN PATENT DOCUMENTS

| CN | 1461891 A | 12/2003 |
| CN | 101160472 A | 4/2008 |

(Continued)

OTHER PUBLICATIONS

Decision to Grant issued Aug. 29, 2023, in corresponding Japanese Patent Application No. 2022-514306, 3 pages (Continued)

*Primary Examiner* — Phillip A Johnson
(74) *Attorney, Agent, or Firm* — Oblon, McClelland, Maier & Neustadt, L.L.P.

(57) ABSTRACT

A semi-floating bearing (multilobe bearing) including: an annular main body through which a shaft is inserted; and a radial bearing surface formed on an inner peripheral surface of the main body, the radial bearing surface including a plurality of arc surfaces having different curvature centers and disposed adjacent to each other in a circumferential direction of the main body, and a minimum distance Ra between a central axis of the shaft and the arc surface, a curvature radius Rb of the arc surface, and a radius Rs of the shaft satisfying relationships expressed by the following Formulas (1) and (2). $Ra/Rs \geq 1.001$ ... (1), $(Rb-Ra)/0.9 \leq (Rb-Rs) \leq (Rb-Ra)/0.6$ ... (2) provided that Ra is the minimum distance between the central axis of the shaft and the arc surface, Rb is the curvature radius of the arc surface, and Rs is the radius of the shaft.

2 Claims, 5 Drawing Sheets

(51) Int. Cl.
  *F04D 29/057* (2006.01)
  *F16C 33/10* (2006.01)
(52) U.S. Cl.
  CPC ...... *F16C 33/1075* (2013.01); *F16C 2240/26* (2013.01); *F16C 2240/70* (2013.01); *F16C 2360/24* (2013.01)
(58) Field of Classification Search
  CPC .. F16C 2360/24; F04D 19/047; F04D 19/057; F02C 7/06
  See application file for complete search history.

(56) References Cited

U.S. PATENT DOCUMENTS

| | | | | |
|---|---|---|---|---|
| 2005/0094905 | A1* | 5/2005 | New | F04D 29/047 384/100 |
| 2006/0159374 | A1* | 7/2006 | Shibahara | F16C 33/1075 384/100 |
| 2010/0092115 | A1* | 4/2010 | Wendling | F16C 17/028 384/99 |
| 2014/0010647 | A1 | 1/2014 | Nishida et al. | |
| 2014/0205223 | A1* | 7/2014 | Maier | F16C 32/0406 384/295 |
| 2015/0267740 | A1 | 9/2015 | Ryu | |
| 2018/0114669 | A1* | 4/2018 | Sporbeck | H01J 35/1017 |
| 2018/0258984 | A1 | 9/2018 | Futae et al. | |

FOREIGN PATENT DOCUMENTS

| | | | | |
|---|---|---|---|---|
| CN | 101184929 | A | | 5/2008 |
| CN | 201236891 | Y | | 5/2009 |
| CN | 102071979 | A | | 5/2011 |
| CN | 104421337 | A | | 3/2015 |
| CN | 107850114 | A | | 3/2018 |
| CN | 109690050 | A | | 4/2019 |
| EP | 1 762 713 | A2 | | 3/2007 |
| FR | 2651845 | A1 | * | 3/1991 |
| JP | 54-118936 | A | | 9/1979 |
| JP | 56-006914 | A | | 1/1981 |
| JP | 61201917 | A | * | 9/1986 |
| JP | 05-215128 | A | | 8/1993 |
| JP | 09-200998 | A | | 7/1997 |
| JP | H11283321 | A | * | 10/1999 |
| JP | 2001-116046 | A | | 4/2001 |
| JP | 3464051 | B2 | * | 11/2003 ............ F16C 17/028 |
| JP | 2007-071165 | A | | 3/2007 |
| JP | 2010-203504 | A | | 9/2010 |
| JP | 4937588 | B2 | | 5/2012 |
| JP | 2012-207584 | A | | 10/2012 |
| JP | 2013-047551 | A | | 3/2013 |
| JP | 2013-245663 | A | | 12/2013 |
| JP | 2015-196419 | A | | 11/2015 |
| JP | 2017057947 | A | * | 3/2017 |
| JP | 2019-065934 | A | | 4/2019 |
| KR | 10-1131386 | B1 | | 4/2012 |
| KR | 10-2015-0097451 | A | | 8/2015 |
| WO | WO 2016/129060 | A1 | | 8/2016 |
| WO | WO 2017/203880 | A1 | | 11/2017 |

OTHER PUBLICATIONS

International Search Report dated Dec. 22, 2020 in PCT/JP2020/042658 filed on November 16, 2020, 4 pages (with English Translation).

* cited by examiner

MULTILOBE BEARING

CROSS REFERENCE TO RELATED APPLICATIONS

This application is a continuation application of International Application No. PCT/JP2020/042658, filed on Nov. 16, 2020, which claims priority to Japanese Patent Application No. 2020-068572, filed on Apr. 6, 2020, the entire contents of which are incorporated by reference herein.

BACKGROUND ART

Technical Field

The present disclosure relates to a multilobe bearing. This application claims the benefit of priority based on Japanese Patent Application No. 2020-068572 filed on Apr. 6, 2020, the contents of which are incorporated herein by reference.

Related Art

Patent Literature 1 discloses a multilobe bearing having a plurality of (specifically, three) arc surfaces. The multilobe bearing pivotally supports the shaft. The plurality of arc surfaces is formed in a region to be a radial bearing surface of the multilobe bearing.

CITATION LIST

Patent Literature

Patent Literature 1: JP 4937588 B2

SUMMARY

Technical Problem

In the multilobe bearing, the allowable rotation speed of the shaft (that is, the limit value of the rotation speed at which the shaft can be stably and pivotally supported) can be improved as compared with the case where the cross-sectional shape of the radial bearing surface is a perfect circle. However, it is considered desirable to further improve the allowable rotation speed of the shaft.

An object of the present disclosure is to provide a multilobe bearing capable of improving an allowable rotation speed of a shaft.

Solution to Problem

In order to solve the above problems, a multilobe bearing of the present disclosure includes: an annular main body through which a shaft is inserted; and a radial bearing surface formed on an inner peripheral surface of the main body, the radial bearing surface including a plurality of arc surfaces having different curvature centers and disposed adjacent to each other in a circumferential direction of the main body, and a minimum distance between a central axis of the shaft and the arc surface, a curvature radius of the arc surface, and a radius of the shaft satisfying relationships expressed by the following Formulas (1) and (2).

$$Ra/Rs \geq 1.001 \tag{1}$$

$$(Rb-Ra)/0.9 \leq (Rb-Rs) \leq (Rb-Ra)/0.6 \tag{2}$$

provided that
Ra is the minimum distance between the central axis of the shaft and the arc surface,
Rb is the curvature radius of the arc surface, and
Rs is the radius of the shaft.

The minimum distance between the central axis of the shaft and the arc surface, the curvature radius of the arc surface, and the radius of the shaft may satisfy the relationship expressed by the above Formula (3).

$$(Rb-Ra)/0.85 \leq (Rb-Rs) \leq (Rb-Ra)/0.75 \tag{3}$$

Effects of Disclosure

According to the present disclosure, it is possible to improve the allowable rotation speed of the shaft.

DESCRIPTION OF EMBODIMENTS

Figure 1:
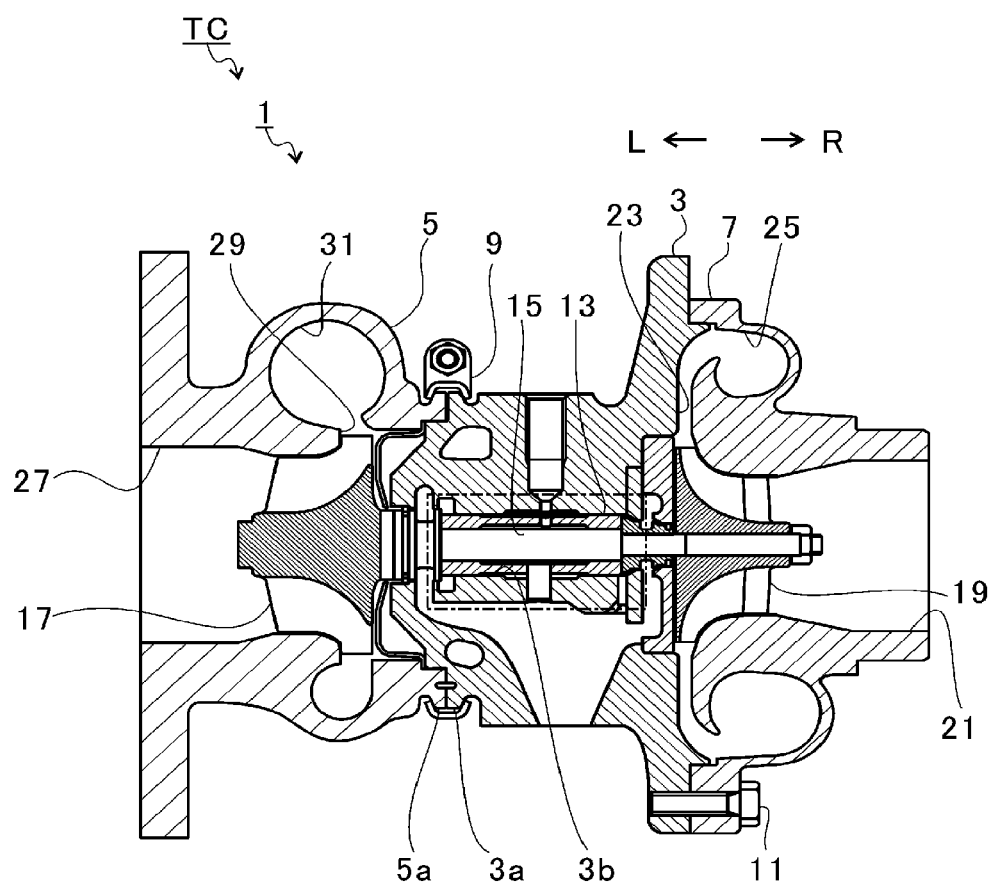
FIG. 1 is a schematic cross-sectional view of a turbocharger.

Hereinafter, an embodiment of the present disclosure will be described with reference to the accompanying drawings. Dimensions, materials, other specific numerical values, and the like shown in the embodiments are merely examples for facilitating understanding, and do not limit the present disclosure unless otherwise specified. Note that, in the present specification and the drawings, elements having substantially the same function and configuration are denoted by the same reference numerals, and redundant description is omitted, and elements not directly related to the present disclosure are not illustrated.

FIG. 1 is a schematic cross-sectional view of a turbocharger TC. Hereinafter, the direction of an arrow L illustrated in FIG. 1 will be described as the left side of the turbocharger TC. The direction of an arrow R illustrated in FIG. 1 will be described as the right side of the turbocharger TC. As illustrated in FIG. 1, the turbocharger TC includes a turbocharger main body 1. The turbocharger main body 1 includes a bearing housing 3, a turbine housing 5, and a compressor housing 7. The turbine housing 5 is connected to the left side of the bearing housing 3 by a fastening mechanism 9. The compressor housing 7 is connected to the right side of the bearing housing 3 by a fastening bolt 11.

A protrusion 3a is provided on the outer peripheral surface of the bearing housing 3. The protrusion 3a is provided on the side of the turbine housing 5. The protrusion 3a protrudes in the radial direction of the bearing housing 3. A protrusion 5a is provided on the outer peripheral surface of the turbine housing 5. The protrusion 5a is provided on the side of the bearing housing 3. The protrusion 5a protrudes in the radial direction of the turbine housing 5. The bearing housing 3 and the turbine housing 5 are band fastened by the fastening mechanism 9. The fastening mechanism 9 is, for example, a G coupling. The fastening mechanism 9 sandwiches the protrusion 3a and the protrusion 5a.

A bearing hole 3b is formed in the bearing housing 3. The bearing hole 3b penetrates the turbocharger TC in the left-right direction. A semi-floating bearing 13 is disposed in the bearing hole 3b. The semi-floating bearing 13 rotatably and pivotally supports a shaft 15. A turbine impeller 17 is provided at the left end portion of the shaft 15. The turbine impeller 17 is rotatably accommodated in the turbine housing 5. A compressor impeller 19 is provided at the right end portion of the shaft 15. The compressor impeller 19 is rotatably accommodated in the compressor housing 7.

An intake port 21 is formed in the compressor housing 7. The intake port 21 opens to the right side of the turbocharger TC. The intake port 21 is connected to an air cleaner (not illustrated). A diffuser flow passage 23 is formed by the opposing surfaces of the bearing housing 3 and the compressor housing 7. The diffuser flow passage 23 pressurizes up the air. The diffuser flow passage 23 is formed in an annular shape. The diffuser flow passage 23 communicates with the intake port 21 via the compressor impeller 19 on the radially inner side.

The compressor housing 7 is provided with a compressor scroll flow passage 25. The compressor scroll flow passage 25 is formed in an annular shape. The compressor scroll flow passage 25 is positioned, for example, closer to the radially outer side of the shaft 15 than the diffuser flow passage 23. The compressor scroll flow passage 25 communicates with an intake port of an engine (not illustrated) and the diffuser flow passage 23. When the compressor impeller 19 rotates, air is sucked into the compressor housing 7 from the intake port 21. The sucked air is pressurized and accelerated in the process of flowing between blades of the compressor impeller 19. The pressurized and accelerated air is pressurized up by the diffuser flow passage 23 and the compressor scroll flow passage 25. The pressurized up air is guided to the intake port of the engine.

A discharge port 27 is formed in the turbine housing 5. The discharge port 27 opens to the left side of the turbocharger TC. The discharge port 27 is connected to an exhaust gas purification device (not illustrated). In the turbine housing 5, a communication passage 29 and a turbine scroll flow passage 31 are formed. The turbine scroll flow passage 31 is formed in an annular shape. The turbine scroll flow passage 31 is positioned, for example, closer to the radially outer side of the turbine impeller 17 than the communication passage 29. The turbine scroll flow passage 31 communicates with a gas inlet port (not illustrated). Exhaust gas discharged from an exhaust manifold of the engine (not illustrated) is guided to the gas inlet port. The communication passage 29 allows the turbine scroll flow passage 31 and the discharge port 27 to communicate with each other via the turbine impeller 17. The exhaust gas guided from the gas inlet port to the turbine scroll flow passage 31 is guided to the discharge port 27 via the communication passage 29 and the turbine impeller 17. The exhaust gas guided to the discharge port 27 rotates the turbine impeller 17 in the flow process.

The rotational force of the turbine impeller 17 is transmitted to the compressor impeller 19 via the shaft 15. When the compressor impeller 19 rotates, the air is pressurized up as described above. In this way, air is guided to the intake port of the engine.

Figure 2:
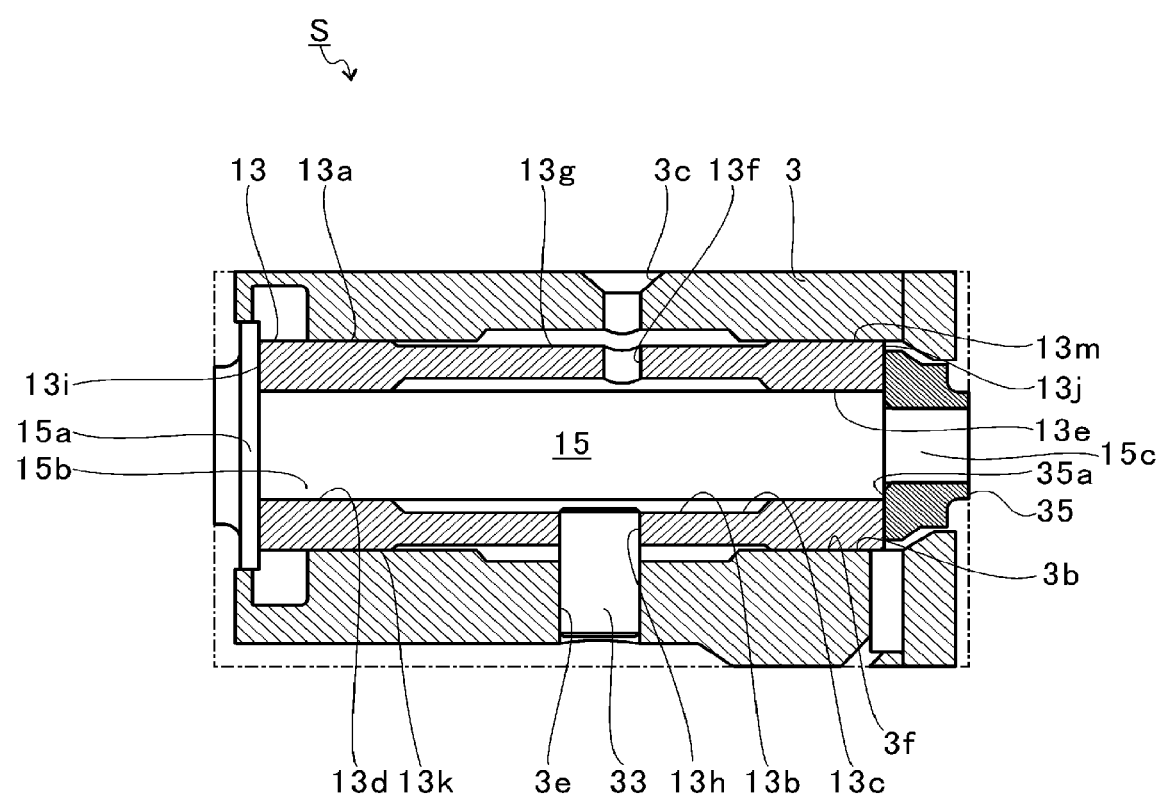
FIG. 2 is a diagram obtained by extracting a long dashed short dashed line portion in FIG. 1.

FIG. 2 is a diagram obtained by extracting a long dashed short dashed line portion in FIG. 1. As illustrated in FIG. 2, a bearing structure S is provided inside the bearing housing 3. The bearing structure S includes the bearing hole 3b, the semi-floating bearing 13, and the shaft 15.

An oil passage 3c is formed in the bearing housing 3. Lubricating oil is supplied to the oil passage 3c. The oil passage 3c opens to (communicates with) the bearing hole 3b. The oil passage 3c guides the lubricating oil to the bearing hole 3b. The lubricating oil flows into the bearing hole 3b from the oil passage 3c.

The semi-floating bearing 13 is disposed in the bearing hole 3b. The semi-floating bearing 13 has an annular main body 13a. An insertion hole 13b is formed in the main body 13a. The insertion hole 13b penetrates the main body 13a in the axial direction of the shaft 15 (hereinafter, simply referred to as an axial direction). The shaft 15 is inserted into the insertion hole 13b.

Two radial bearing surfaces 13d and 13e are formed on an inner peripheral surface 13c of the main body 13a (specifically, the insertion hole 13b). The two radial bearing surfaces 13d and 13e are spaced apart in the axial direction. An oil hole 13f is formed in the main body 13a. The oil hole 13f penetrates from the inner peripheral surface 13c to an outer peripheral surface 13g of the main body 13a. The oil hole 13f is disposed between the two radial bearing surfaces 13d and 13e. The oil hole 13f faces the opening of the oil passage 3c in the radial direction of the shaft 15 (and the main body 13a) (hereinafter, simply referred to as a radial direction).

The lubricating oil flows from the side of the outer peripheral surface 13g of the main body 13a to the side of the inner peripheral surface 13c through the oil hole 13f. The lubricating oil flowing into the side of the inner peripheral surface 13c of the main body 13a moves between the inner peripheral surface 13c and the shaft 15 along the circumferential direction of the shaft 15. In addition, the lubricating oil flowing into the side of the inner peripheral surface 13c of the main body 13a moves between the inner peripheral surface 13c and the shaft 15 along the axial direction of the shaft 15 (left-right direction in FIG. 2). The lubricating oil is supplied to the clearance between the shaft 15 and the two radial bearing surfaces 13d and 13e. The shaft 15 is pivotally supported by the oil film pressure of the lubricating oil. The two radial bearing surfaces 13d and 13e receive the radial load of the shaft 15.

A penetration hole 13h is formed in the main body 13a. The penetration hole 13h penetrates from the inner peripheral surface 13c to the outer peripheral surface 13g of the main body 13a. The penetration hole 13h is disposed between the two radial bearing surfaces 13d and 13e. The penetration hole 13h is disposed on the side of the main body 13a opposite to the side where the oil hole 13f is formed. However, the present disclosure is not limited to this, and the position of the penetration hole 13h may be different from the position of the oil hole 13f in the circumferential direction of the main body 13a.

A pin hole 3e is formed in the bearing housing 3. The pin hole 3e is formed in the bearing hole 3b at a position facing the penetration hole 13h. The pin hole 3e penetrates a wall portion forming the bearing hole 3b. The pin hole 3e communicates the internal space and the external space of the bearing hole 3b. A positioning pin 33 is inserted into the pin hole 3e.

In the present embodiment, the positioning pin 33 is press-fitted into the pin hole 3e. The tip of the positioning pin 33 is inserted into the penetration hole 13h of the main body 13a. The positioning pin 33 restricts the movement of the main body 13a in the rotation direction and the axial direction.

The shaft 15 includes a large-diameter portion 15a, a medium-diameter portion 15b, and a small-diameter portion 15c. The large-diameter portion 15a is positioned closer to the side of the turbine impeller 17 (see FIG. 1) than the main body 13a. The large-diameter portion 15a has a columnar shape. The outer diameter of the large-diameter portion 15a is larger than the inner diameter of the inner peripheral surface 13c (specifically, the radial bearing surface 13d) of the main body 13a. The outer diameter of the large-diameter portion 15a is larger than the outer diameter of the outer peripheral surface 13g of the main body 13a. However, the outer diameter of the large-diameter portion 15a may be equal to or smaller than the outer diameter of the outer peripheral surface 13g of the main body 13a. The large-diameter portion 15a faces the main body 13a in the axial direction. The large-diameter portion 15a has a constant outer diameter. However, the outer diameter of the large-diameter portion 15a may not be constant.

The medium-diameter portion 15b is positioned closer to the side of the compressor impeller 19 (see FIG. 1) than the large-diameter portion 15a. The medium-diameter portion 15b has a columnar shape. The medium-diameter portion 15b is inserted into the insertion hole 13b of the main body 13a. Therefore, the medium-diameter portion 15b faces the inner peripheral surface 13c of the insertion hole 13b in the radial direction. The medium-diameter portion 15b has an outer diameter smaller than that of the large-diameter portion 15a. The outer diameter of the medium-diameter portion 15b is smaller than the inner diameters of the radial bearing surfaces 13d and 13e of the main body 13a. The medium-diameter portion 15b has a constant outer diameter. However, the outer diameter of the medium-diameter portion 15b may not be constant.

The small-diameter portion 15c is positioned closer to the side of the compressor impeller 19 (see FIG. 1) than the medium-diameter portion 15b (and the main body 13a). The small-diameter portion 15c has a columnar shape. The small-diameter portion 15c has an outer diameter smaller than that of the medium-diameter portion 15b. The small-diameter portion 15c has a constant outer diameter. However, the outer diameter of the small-diameter portion 15c may not be constant.

An annular oil thrower member 35 is inserted into the small-diameter portion 15c. The oil thrower member 35 scatters the lubricating oil flowing along the shaft 15 to the side of the compressor impeller 19 radially outward. That is, the oil thrower member 35 suppresses leakage of the lubricating oil to the side of the compressor impeller 19.

The oil thrower member 35 has an outer diameter larger than that of the medium-diameter portion 15b. The outer diameter of the oil thrower member 35 is larger than the inner diameter of the inner peripheral surface 13c (specifically, the radial bearing surface 13e) of the main body 13a. The outer diameter of the oil thrower member 35 is smaller than the outer diameter of the outer peripheral surface 13g of the main body 13a. However, the outer diameter of the oil thrower member 35 may be equal to or larger than the outer diameter of the outer peripheral surface 13g of the main body 13a. The oil thrower member 35 faces the main body 13a in the axial direction.

The main body 13a is sandwiched between the oil thrower member 35 and the large-diameter portion 15a in the axial direction. Lubricating oil is supplied to the clearance between the main body 13a and the oil thrower member 35. Lubricating oil is supplied to the clearance between the main body 13a and the large-diameter portion 15a.

When the shaft 15 moves in the axial direction (left side in FIG. 2), the load in the axial direction is supported by the oil film pressure of the lubricating oil between the main body 13a and the oil thrower member 35. When the shaft 15 moves in the axial direction (right side in FIG. 2), the load in the axial direction is supported by the oil film pressure of the lubricating oil between the main body 13a and the large-diameter portion 15a. That is, both end surfaces of the main body 13a in the axial direction are thrust bearing surfaces 13i and 13j that receive a thrust load.

Damper portions 13k and 13m are formed on the outer peripheral surface 13g of the main body 13a. The damper portions 13k and 13m are spaced apart from each other in the axial direction. The damper portions 13k and 13m are formed at both end portions of the outer peripheral surface 13g in the axial direction. The outer diameters of the damper portions 13k and 13m are larger than the outer diameters of other portions of the outer peripheral surface 13g. Lubricating oil is supplied to the clearance between the damper portions 13k and 13m and an inner peripheral surface 3f of the bearing hole 3b. The vibration of the shaft 15 is suppressed by the oil film pressure of the lubricating oil.

Figure 3:
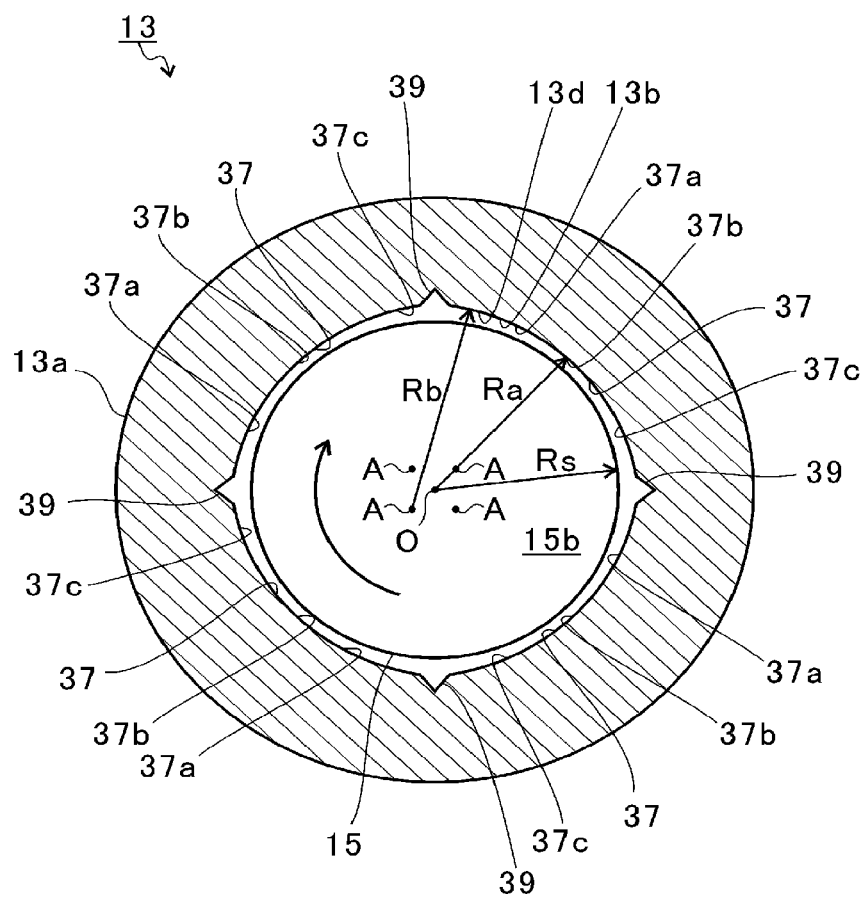
FIG. 3 is an explanatory view for explaining a shape of a radial bearing surface of the present embodiment.

FIG. 3 is an explanatory view for explaining a shape of the radial bearing surface 13d of the present embodiment. FIG. 3 is a cross-sectional view (a cross-sectional view perpendicular to a central axis O of the shaft 15 (that is, the central axis of the insertion hole 13b)) of a portion of the main body 13a where the radial bearing surface 13d is formed, perpendicular to the axial direction of the shaft 15. Here, the cross-sectional shape of the radial bearing surface 13d will be described. The radial bearing surface 13e has substantially the same shape as the radial bearing surface 13d. Therefore, description of the shape of the radial bearing surface 13e is omitted.

As illustrated in FIG. 3, a plurality of arc surfaces 37 and a plurality of axial grooves 39 are formed on the radial bearing surface 13d. In the present embodiment, the radial bearing surface 13d has four arc surfaces 37 and four axial grooves 39. However, the number of the plurality of arc surfaces 37 and the number of the plurality of axial grooves 39 are not limited to this. For example, the number of the plurality of arc surfaces 37 may be 2, 3, 5, or 6 or more. The number of the plurality of axial grooves 39 may be 2, 3, 5, or 6 or more. The number of the arc surfaces 37 and the number of the axial grooves 39 are the same. However, the number of the arc surfaces 37 and the number of the axial grooves 39 may be different.

The arc surface 37 has a curvature center A positioned on the inner side of the radial bearing surface 13d (that is, the inner side of the insertion hole 13b). The curvature center A of the arc surface 37 is positioned at a position different from the central axis O of the shaft 15. The curvature centers A of the plurality of arc surfaces 37 are positioned at different positions. The curvature centers A of the plurality of arc surfaces 37 are positioned at positions spaced apart from the central axis O of the shaft 15 in the radial direction. The curvature centers A of the plurality of arc surfaces 37 are positioned on concentric circles centered on the central axis O. The curvature centers A of the plurality of arc surfaces 37 are disposed at equal intervals in the circumferential direction of the main body 13a (hereinafter, simply referred to as a circumferential direction).

The plurality of arc surfaces 37 is spaced apart from the shaft 15 in the radial direction. The plurality of arc surfaces 37 is disposed adjacent to each other in the circumferential direction of the main body 13a (and the radial bearing surface 13d). The axial groove 39 is formed between two adjacent arc surfaces 37. The axial groove 39 extends in the axial direction of the shaft 15. A cross section perpendicular to the axial direction of the axial groove 39 has a triangular shape. However, the present disclosure is not limited to this, and the cross section perpendicular to the axial direction of the axial groove 39 may have a rectangular shape, a semicircular shape, or a polygonal shape.

The axial groove 39 extends from an end portion of the radial bearing surface 13d on a side where the two radial bearing surfaces 13d and 13e (see FIG. 2) are close to each other to an end portion on a side where the two radial bearing surfaces 13d and 13e are spaced apart from each other. The axial groove 39 is open to the thrust bearing surface 13i (that is, the end surface of the main body 13a in the axial direction). The axial groove 39 allows lubricating oil to flow. The axial groove 39 supplies lubricating oil to the radial bearing surface 13d. In addition, the axial groove 39 supplies lubricating oil to the thrust bearing surface 13i.

The arc surface 37 includes a reduction portion 37a, an intermediate portion 37b, and an enlargement portion 37c. The reduction portion 37a is positioned on the rear side of the arc surface 37 in the rotation direction of the shaft 15 (arrow direction in FIG. 3). The intermediate portion 37b is positioned in the middle (center) of the arc surface 37 in the circumferential direction. The enlargement portion 37c is positioned on the front side of the arc surface 37 in the rotation direction of the shaft 15. That is, the reduction portion 37a is positioned on the rear side in the rotation direction of the shaft 15 with respect to the intermediate portion 37b. The enlargement portion 37c is positioned on the front side in the rotation direction of the shaft 15 with respect to the intermediate portion 37b.

The interval between the shaft 15 and the arc surface 37 is the smallest at the intermediate portion 37b. The interval between the shaft 15 and the reduction portion 37a is larger than the interval between the shaft 15 and the intermediate portion 37b. The interval between the shaft 15 and the reduction portion 37a increases toward the rear side in the rotation direction of the shaft 15. The interval between the shaft 15 and the enlargement portion 37c is larger than the interval between the shaft 15 and the intermediate portion 37b. The interval between the shaft 15 and the enlargement portion 37c decreases toward the rear side in the rotation direction of the shaft 15.

The lubricating oil between the shaft 15 and the radial bearing surface 13d moves in the rotation direction of the shaft 15 as the shaft 15 rotates. At this time, the lubricating oil is compressed from the reduction portion 37a toward the intermediate portion 37b. The compressed lubricating oil presses the shaft 15 radially inward (that is, in the radial direction) (wedge effect). Thus, the load in the radial direction is supported by the radial bearing surface 13d.

On the radial bearing surface 13d, a plurality of (here, four) reduction portions 37a and intermediate portions 37b are formed. The plurality of reduction portions 37a and the intermediate portions 37b are disposed at equal intervals in the circumferential direction of the radial bearing surface 13d. The shaft 15 is pressed radially inward by the plurality of reduction portions 37a and the intermediate portion 37b. Thus, the shaft 15 is stably and pivotally supported by the semi-floating bearing 13. As described above, the semi-floating bearing 13 of the present embodiment is a multilobe bearing having the plurality of arc surfaces 37. As a result, the stability of pivotally supporting the shaft 15 can be improved.

The stability of pivotally supporting the shaft 15 changes according to a preload coefficient Mp expressed by the following Formula (4). Note that a case where the preload coefficient Mp is 0 corresponds to a case where the cross-sectional shape of the radial bearing surface 13d is a perfect circle.

$$Mp = 1 - (Ra - Rs)/(Rb - Rs) \quad (4)$$

As illustrated in FIG. 3, in Formula (4), Ra represents the minimum distance between the central axis O and the arc surface 37, Rb represents the curvature radius of the arc surface 37, and Rs represents the radius of the shaft 15 (specifically, the medium-diameter portion 15b). The minimum distance Ra between the central axis O and the arc surface 37 corresponds to the distance between the central axis O and the intermediate portion 37b. The curvature radius Rb of the arc surface 37 corresponds to the sum of the minimum distance Ra between the central axis O and the arc surface 37 and the distance from the central axis O to the curvature center A. The curvature radius Rb of the plurality of arc surfaces 37 are equal to each other. However, the curvature radius Rb of the plurality of arc surface 37 may be different from each other.

The range of the preload coefficient Mp in which the allowable rotation speed of the shaft 15 (that is, the limit value of the rotation speed at which the shaft 15 can be stably and pivotally supported) is effectively improved was derived by the actual machine test. Hereinafter, the results of the actual machine test will be described.

In the actual machine test, the allowable rotation speed of the shaft 15 was identified by observing the behavior of the shaft 15 while gradually raising the rotation speed of the shaft 15 inserted into the semi-floating bearing 13 under the condition that the above Formula (1) (Ra/Rs≥1.001) is satisfied. The preload coefficient Mp was changed by changing the dimensions of the radial bearing surfaces 13d and 13e (specifically, the curvature radius Rb of the arc surface 37 and the position of the curvature center A) and the dimensions of the shaft 15 (specifically, the radius Rs of medium-diameter portion 15b). For each of the variously different preload coefficients Mp, the allowable rotation speed of the shaft 15 was identified.

Ra/Rs corresponds to an index indicating the size of the minimum clearance between the shaft 15 and the radial bearing surface 13d. When the minimum clearance between the shaft 15 and the radial bearing surface 13d is excessively small, lubricating oil is insufficient between the shaft 15 and the radial bearing surface 13d, and it may be difficult to stably and pivotally support the shaft 15. According to the results of the actual machine test, it was found that the shortage of the lubricating oil between the shaft 15 and the radial bearing surface 13d can be suppressed when the above Formula (1) (Ra/Rs≥1.001) is satisfied.

Figure 4:
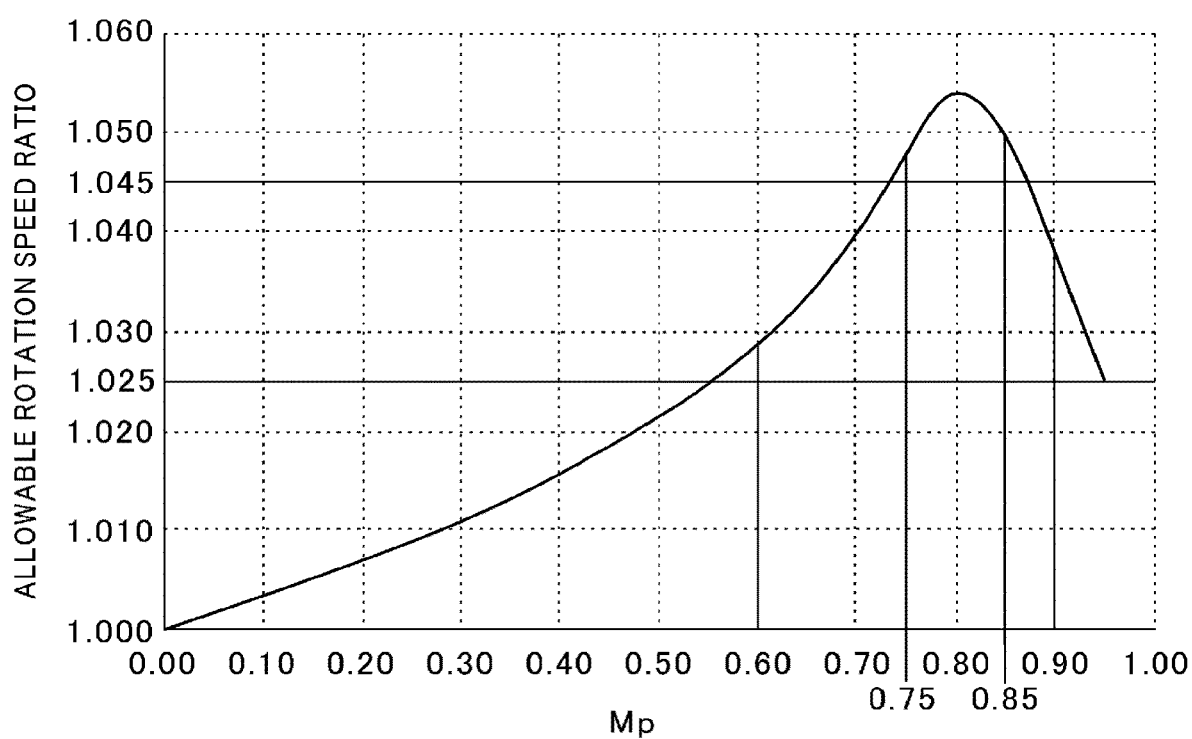
FIG. 4 is a diagram illustrating a relationship between a preload coefficient and an allowable rotation speed ratio.

The results regarding the allowable rotation speed of the actual machine test are shown in FIG. 4. FIG. 4 is a diagram illustrating a relationship between the preload coefficient Mp and an allowable rotation speed ratio. The allowable rotation speed ratio in FIG. 4 indicates a ratio to the allowable rotation speed when the preload coefficient Mp is 0 (that is, a case where the cross-sectional shape of the radial bearing surface 13d is a perfect circle). The larger the allowable rotation speed ratio, the higher the allowable rotation speed of the shaft 15.

According to FIG. 4, when the preload coefficient Mp is within the range from 0.0 to around 0.8, the allowable rotation speed ratio increases as the preload coefficient Mp rises. The allowable rotation speed ratio is maximized when the preload coefficient Mp is around 0.8. When the preload coefficient Mp is within the range from around 0.8 to 1.0, the allowable rotation speed ratio falls as the preload coefficient Mp increases.

As the preload coefficient Mp is larger, the cross-sectional shape of the radial bearing surface 13d is closer to a square than a perfect circle, such that the interval between the shaft 15 and the end portion on the rear side in the rotation direction of the shaft 15 in the reduction portion 37a is larger. As a result, the wedge effect (that is, the effect of pressing the shaft 15 radially inward) by the lubricating oil compressed with the rotation of the shaft 15 increases, and the stability of pivotally supporting the shaft 15 increases. On the other hand, when the preload coefficient Mp is excessively large, the range in which the compressed lubricating oil exists between the shaft 15 and the radial bearing surface 13d becomes excessively narrow. As a result, the range in which the load in the radial direction is supported on the radial bearing surface 13d becomes excessively narrow, and the stability of pivotally supporting the shaft 15 conversely decreases. Therefore, as illustrated in FIG. 4, in the process of increasing the preload coefficient Mp, the allowable rotation speed ratio rises and then falls.

According to FIG. 4, when the preload coefficient Mp satisfies the following Formula (5), the allowable rotation speed ratio exceeds 1.025, and the allowable rotation speed is effectively improved.

$$0.6 \leq Mp \leq 0.9 \tag{5}$$

The above Formula (2) $((Rb-Ra)/0.9 \leq (Rb-Rs) \leq (Rb-Ra)/0.6)$ is derived from Formula (5). In the semi-floating bearing 13 of the present embodiment, the minimum distance Ra between the central axis O of the shaft 15 and the arc surface 37, the curvature radius Rb of the arc surface 37, and the radius Rs of the shaft 15 satisfy the relationship expressed by the above Formula (2) in addition to the above Formula (1). As a result, the allowable rotation speed of the shaft 15 can be improved.

According to FIG. 4, when the preload coefficient Mp satisfies the following Formula (6), the allowable rotation speed ratio exceeds 1.045, and the allowable rotation speed is more effectively improved.

$$0.75 \leq Mp \leq 0.85 \tag{6}$$

The above Formula (3) $((Rb-Ra)/0.85 \leq (Rb-Rs) \leq (Rb-Ra)/0.75)$ is derived from the Formula (6). The minimum distance Ra between the central axis O of the shaft 15 and the arc surface 37, the curvature radius Rb of the arc surface 37, and the radius Rs of the shaft 15 preferably satisfy the relationship expressed by the above Formula (3). As a result, the allowable rotation speed of the shaft 15 can be more effectively improved.

In the actual machine test, a loss in the semi-floating bearing 13 was identified for each of various different preload coefficients Mp. The loss is a friction loss generated in the semi-floating bearing 13. The loss was identified by comparing the energy input to the shaft 15 and the energy output from the shaft 15.

Figure 5:
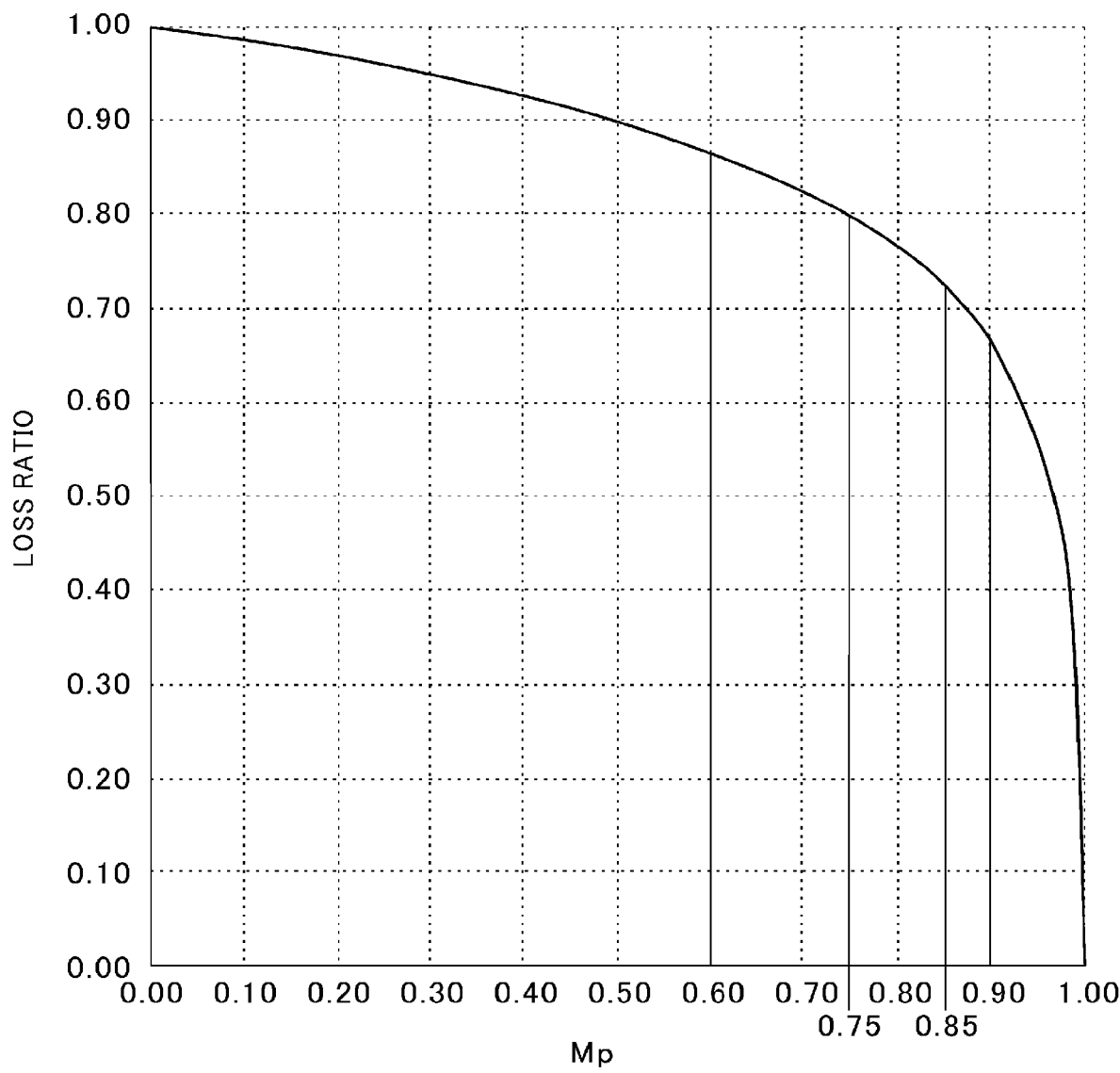
FIG. 5 is a diagram illustrating a relationship between a preload coefficient and a loss ratio.

The results regarding the loss of the actual machine test are shown in FIG. 5. FIG. 5 is a diagram illustrating a relationship between the preload coefficient Mp and a loss ratio. The loss ratio in FIG. 5 indicates a ratio to the loss when the preload coefficient Mp is 0 (that is, a case where the cross-sectional shape of the radial bearing surface 13d is a perfect circle). The smaller the loss ratio, the smaller the friction loss generated in the semi-floating bearing 13.

As can be seen from FIG. 5, the loss ratio decreases as the preload coefficient Mp increases. The larger the preload coefficient Mp, the larger the average value in the circumferential direction of the interval between the shaft 15 and the radial bearing surface 13d (specifically, the interval between the shaft 15 and the reduction portion 37a and the interval between the shaft 15 and the enlargement portion 37c). As a result, the amount of heat generated by the lubricating oil between the shaft 15 and the radial bearing surface 13d is reduced, such that the friction loss generated in the semi-floating bearing 13 is reduced.

According to FIG. 5, when the preload coefficient Mp satisfies the above formula (5) ($0.6 \leq Mp \leq 0.9$), the loss ratio is smaller than 0.90 (in particular, when the preload coefficient Mp is 0.9, the loss ratio is smaller than 0.70). When the preload coefficient Mp satisfies the above Formula (6) ($0.75 \leq Mp \leq 0.85$), the loss ratio is smaller than 0.80. As described above, it can be seen that the loss is effectively reduced when the preload coefficient Mp satisfies the above Formula (5) or the above Formula (6).

Although the embodiments of the present disclosure have been described above with reference to the accompanying drawings, it goes without saying that the present disclosure is not limited to such embodiments. It is obvious that a person skilled in the art can conceive various changes or modifications within the scope described in the claims, and it is understood that those changes or modifications naturally belong to the technical scope of the present disclosure.

The example in which the multilobe bearing is the semi-floating bearing 13 has been described above. However, the present disclosure is not limited to this, and the multilobe bearing may be a full floating bearing. If the multilobe bearing is a full floating bearing, a plurality of arc surfaces having different curvature centers and disposed adjacent to each other in the circumferential direction may be formed on the inner peripheral surface 3f of the bearing hole 3b of the bearing housing 3. When a plurality of arc surfaces are formed on the inner peripheral surface 3f of the bearing hole 3b, it is preferable that the minimum distance between the central axis of the full floating bearing and the arc surface, the curvature radius of the arc surface, and the radius of the outer peripheral surface of the full floating bearing satisfy the similar relationship as the relationship expressed by the above Formulas (1) and (2). In this case, the minimum distance between the central axis of the full floating bearing and the arc surface of the bearing hole 3b corresponds to Ra in the above Formulas (1) and (2), the curvature radius of the arc surface corresponds to Rb in the above Formulas (1) and (2), and the radius of the outer peripheral surface of the full floating bearing corresponds to Rs in the above Formulas (1) and (2).

What is claimed is:

1. A multilobe bearing comprising:
   an annular main body through which a shaft is inserted; and
   a radial bearing surface formed on an inner peripheral surface of the main body, the radial bearing surface including a plurality of arc surfaces having different curvature centers and disposed adjacent to each other in a circumferential direction of the main body, and a minimum distance between a central axis of the shaft and the arc surfaces, a curvature radius of the arc surfaces, and a radius of the shaft satisfying relationships expressed by the following Formulas (1) and (2):

$$Ra/Rs \geq 1.001 \tag{1}$$

$$(Rb-Ra)/0.9 \leq (Rb-Rs) \leq (Rb-Ra)/0.6 \tag{2}$$

provided that
Ra is the minimum distance between the central axis of the shaft and the arc surfaces,
Rb is the curvature radius of the arc surfaces, and
Rs is the radius of the shaft.

2. The multilobe bearing according to claim 1, wherein the minimum distance between the central axis of the shaft and the arc surfaces, the curvature radius of the arc surfaces, and the radius of the shaft satisfy a relationship expressed by the following Formula (3):

$(Rb-Ra)/0.85 \leq (Rb-Rs) \leq (Rb-Ra)/0.75$ (3).

\* \* \* \* \*